(12) United States Patent
Grote

(10) Patent No.: US 9,393,936 B1
(45) Date of Patent: Jul. 19, 2016

(54) TRACTOR-TRAILER LANDING GEAR LOCK

(71) Applicant: NEFFCO TECHNOLOGIES, Ankeny, IA (US)

(72) Inventor: Jeff M. Grote, Ankeny, IA (US)

(73) Assignee: Neffco Technologies, Ankeny, IA (US)

( * ) Notice: Subject to any disclaimer, the term of this patent is extended or adjusted under 35 U.S.C. 154(b) by 0 days.

(21) Appl. No.: 14/225,498

(22) Filed: Mar. 26, 2014

Related U.S. Application Data

(60) Provisional application No. 61/805,419, filed on Mar. 26, 2013.

(51) Int. Cl.
*B60S 9/04* (2006.01)

(52) U.S. Cl.
CPC .......................................... *B60S 9/04* (2013.01)

(58) Field of Classification Search
CPC ............................ B60R 25/001; B60R 25/003
USPC ...................... 280/763.1, 764.1, 765.1, 766.1
See application file for complete search history.

(56) References Cited

U.S. PATENT DOCUMENTS

| | | | | |
|---|---|---|---|---|
| 3,695,631 A * | 10/1972 | Schwaiger | ................... | 280/507 |
| 4,730,468 A * | 3/1988 | Becker | ............................. | 70/34 |
| 5,426,961 A * | 6/1995 | Rimbaud et al. | ................ | 70/237 |
| 5,782,115 A * | 7/1998 | Judy | ............................... | 70/164 |
| 6,141,997 A * | 11/2000 | Blehi, III | ......................... | 70/56 |
| 6,434,982 B1* | 8/2002 | Rowland | ......................... | 70/211 |
| 6,517,112 B1* | 2/2003 | Watkins | ..................... | 280/763.1 |
| 6,705,137 B2* | 3/2004 | Saladin et al. | .................. | 70/212 |
| 6,729,595 B2* | 5/2004 | Smith | .......................... | 248/518 |
| 7,337,636 B2* | 3/2008 | Witchey | ............................ | 70/14 |
| 7,584,677 B1* | 9/2009 | Johnson et al. | ............... | 74/89.23 |
| 2003/0094801 A1* | 5/2003 | Fox | ............................. | 280/766.1 |
| 2006/0202460 A1* | 9/2006 | Baxter et al. | ............... | 280/763.1 |
| 2006/0202461 A1* | 9/2006 | Baxter et al. | ............... | 280/766.1 |
| 2008/0164683 A1* | 7/2008 | VanDenberg | .............. | 280/766.1 |

* cited by examiner

*Primary Examiner* — Jeffrey J Restifo
(74) *Attorney, Agent, or Firm* — McKee, Voorhees & Sease, PLC

(57) ABSTRACT

A jack lock for a landing gear crank of a tractor-trailer includes a four sided box to enclose the crank on four sides. A pin extends rearwardly within the box and extends through the crank yoke on the inner end of the crank, to preclude the yoke and crank from being moved from a lowered inoperative position to a raised operative position. A padlock is mountable on the end of the shaft to lock the box onto the crank.

19 Claims, 5 Drawing Sheets

TRACTOR-TRAILER LANDING GEAR LOCK

CROSS REFERENCE TO RELATED APPLICATIONS

This application claims priority under 35 U.S.C. §119 to provisional applications U.S. Ser. No. 61/805,419 filed Mar. 26, 2013, herein incorporated by reference in its entirety.

FIELD OF THE INVENTION

The invention relates to a lock assembly for landing gear of a truck or tractor-pulled trailer to preclude use of the hand crank of the landing gear, thereby preventing theft of the trailer.

BACKGROUND OF THE INVENTION

Over-the-road tractor-trailers are often parked with the tractor uncoupled from the trailer. Theft is a common problem for parked trailers which have been disengaged or detached from a tractor. A thief can easily back a tractor up to the trailer and couple the king pin, then raise the landing gear legs via the hand crank or crank handle of the landing gear, and drive away. Trailer theft also occurs for trailers hitched to a tractor, and even with switching of tractors. If the crank handle can be disenabled, the landing gear cannot be raised or lowered, such that theft of the trailer can be prevented or at least made substantially more difficult.

Accordingly, a primary objective of the present invention is the provision of a jack lock for mounting on the crank handle to disenable the handle.

Another objective of the present invention is the provision of a lock box which fits over the yoke of the hand crank to prevent the landing gear legs from being raised.

A further objective of the present invention is the provision of a lock box mountable on the landing gear handle to preclude rotation of the landing gear shaft.

Still another objective of the present invention is the provision of a jack lock which can be quickly and easily locked onto the landing gear handle without the use of tools.

Yet another objective of the present invention is the provision of a jack lock for the crank handle of a trailer landing gear which is virtually tamper proof and indestructible.

Another objective of the present invention is the provision of a lock box for a trailer landing gear which is economical to manufacture, and durable and safe in use.

These and other objectives will become apparent from the following description of the invention.

SUMMARY OF THE INVENTION

The jack lock of the present invention is in the form of a box which is mounted over the crank handle yoke of the landing gear of a trailer to prevent the handle from being raised from an inoperative position to an operative position. The lock box or housing has opposite side walls, a top wall, and a front wall, with an open back and open bottom. A pin extends rearwardly from the front wall and through the yoke of the landing gear handle. A padlock is mounted through a hole in the end of pin to preclude the jack lock from being removed from the hand crank of the landing gear. The jack lock box and pin are rigid and oriented so as to preclude cutting or grinding of the padlock shackle.

DETAILED DESCRIPTION OF THE PREFERRED EMBODIMENTS

Figure 1:
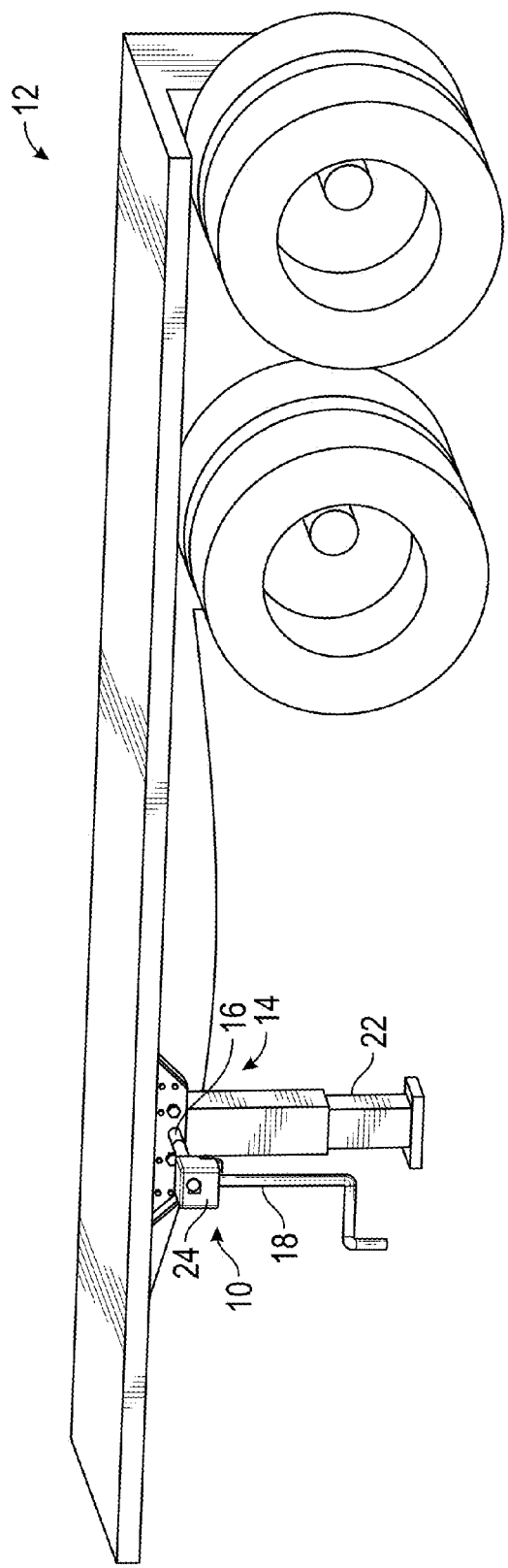
FIG. 1 is a front perspective view showing the jack lock mounted on the handle of the landing gear of a trailer, in accordance with the present invention.
Figure 2:
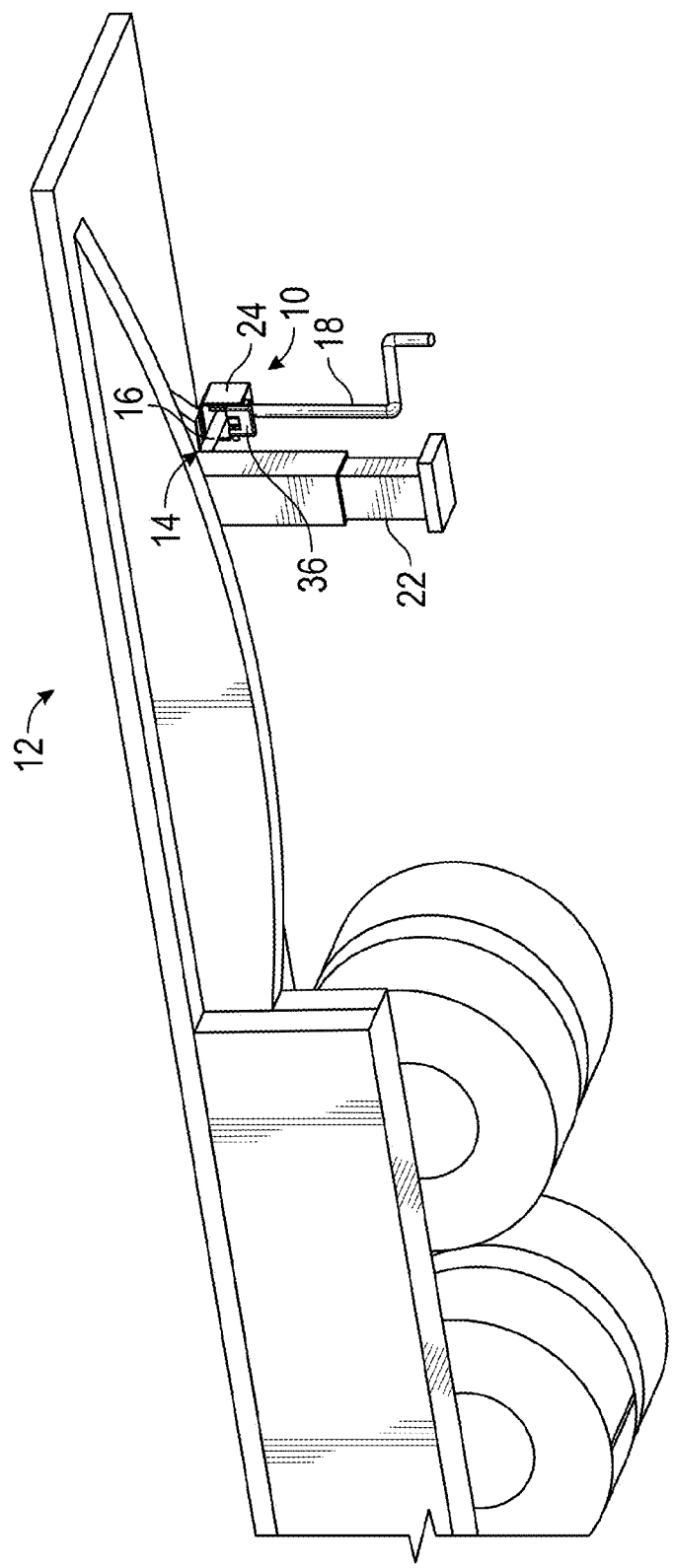
FIG. 2 is a rear perspective view of the jack lock mounted on the handle of landing gear of the trailer.
Figure 3:
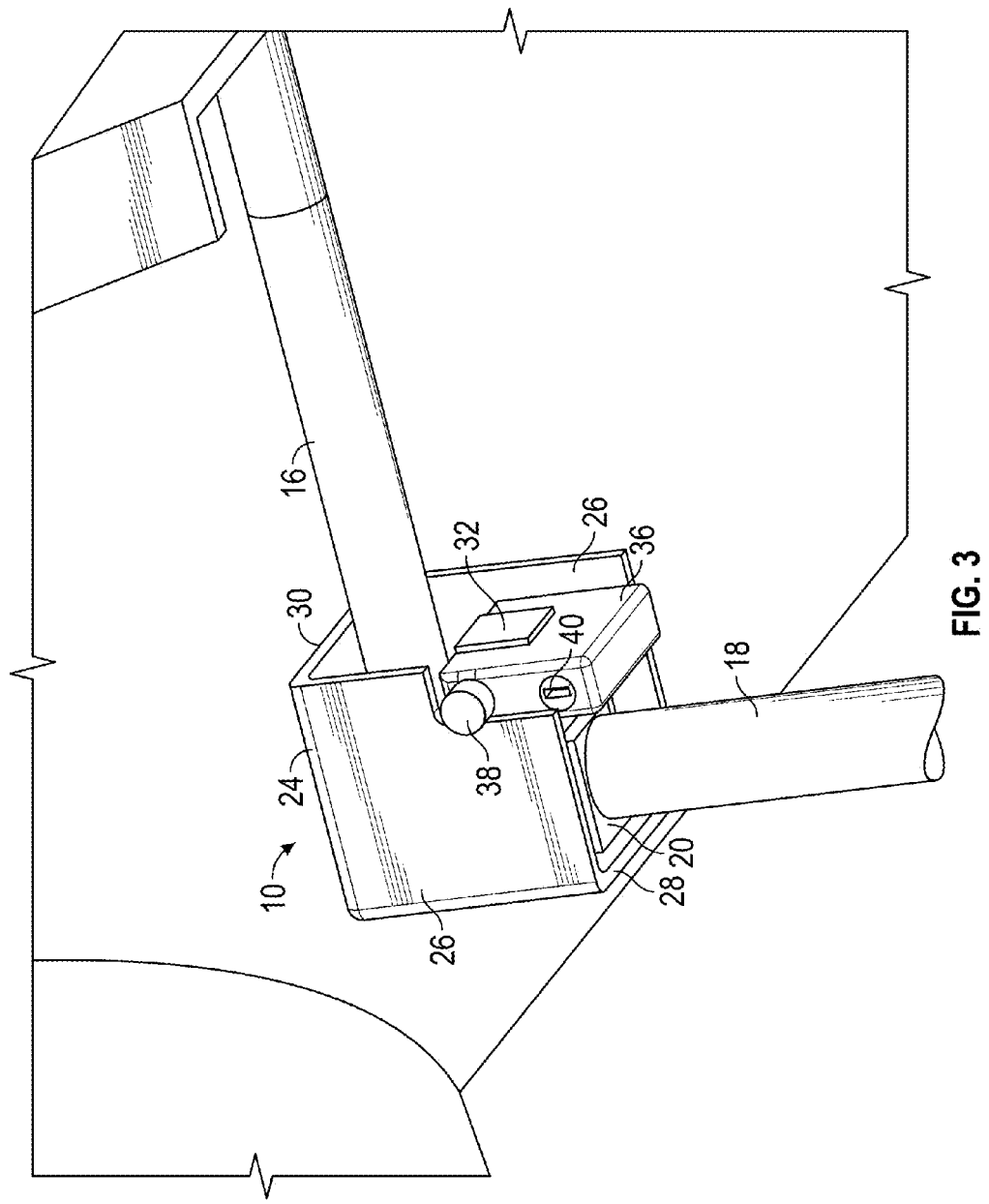
FIG. 3 is an enlarged perspective view of the jack lock mounted on the handle of the landing gear of the trailer.
Figure 4:
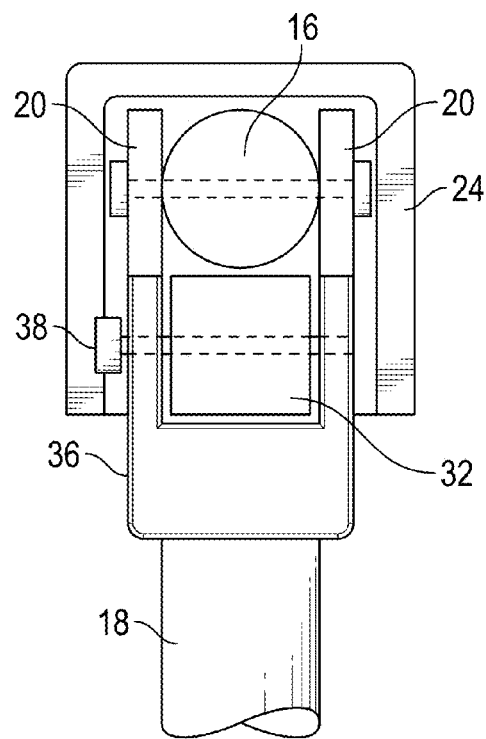
FIG. 4 is a rear elevation view of the jack lock mounted on the handle.
Figure 6:
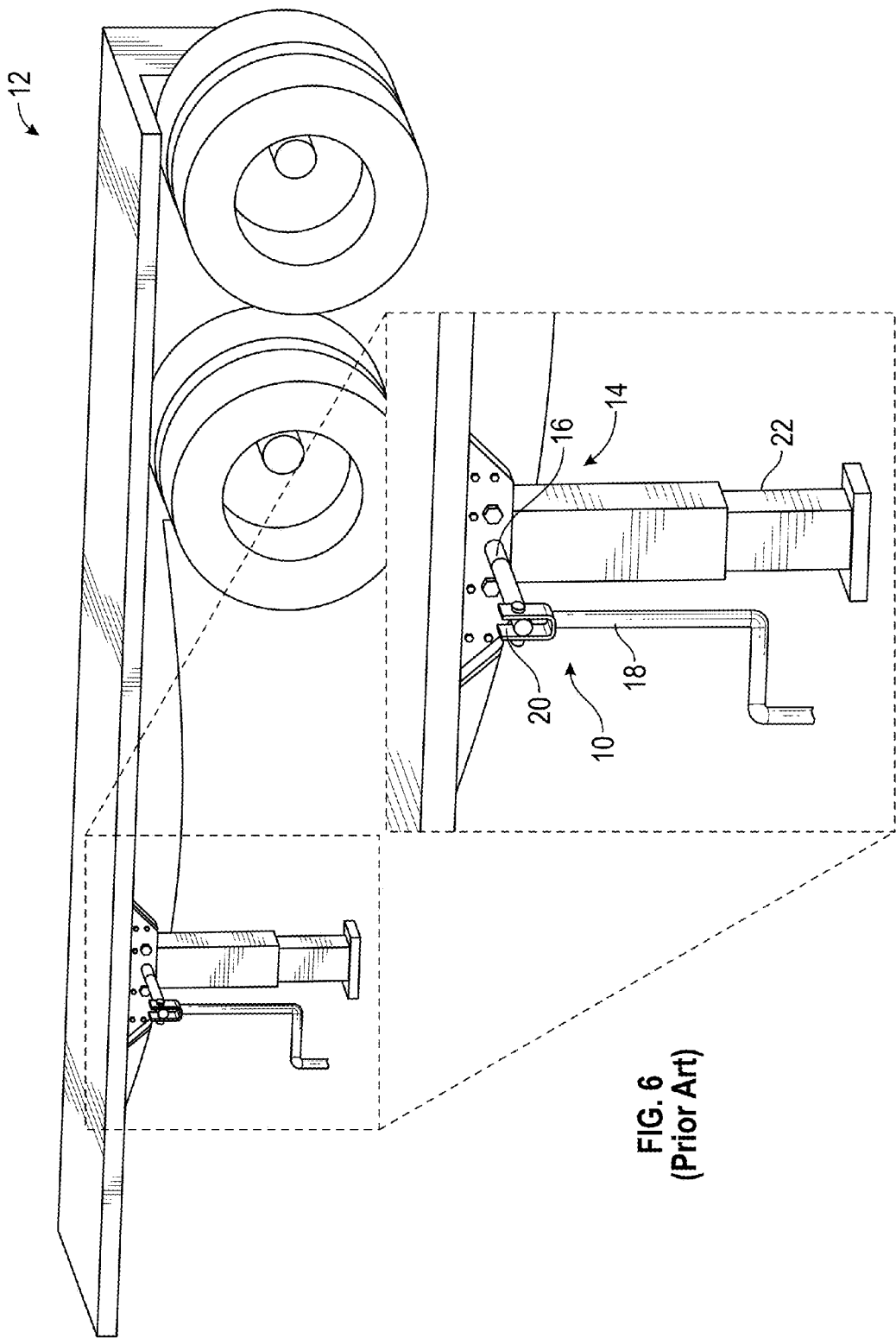
FIG. 6 is a perspective view of the landing gear of the trailer, without the jack lock mounted thereon.

The jack lock of the present invention is generally designated in the drawings by the reference numeral 10. The jack lock 10 is intended for use on a trailer 12 which is conventionally pulled by a tractor (not shown). The trailer 12 includes a landing gear assembly 14, with a rotatable shaft 16, which can be turned in opposite directions by a crank handle 18. A yoke 20 connects the crank handle 18 to the shaft 16, and allows the crank handle 18 to move between a lowered inoperative position, as shown in FIGS. 1, 2 and 6, and a raised operative position to turn the shaft 16. Upon rotation of the shaft 16, the landing gear legs 22 are lowered for parking the trailer or raised for trailer transport. The legs 22 of the landing gear 14 are normally raised and lowered while the trailer 12 is coupled to the tractor. When the legs 22 are lowered into engagement with the ground to support the trailer, the tractor can be engaged and disengaged from the trailer king pin, as is well-known in the art.

Figure 5:
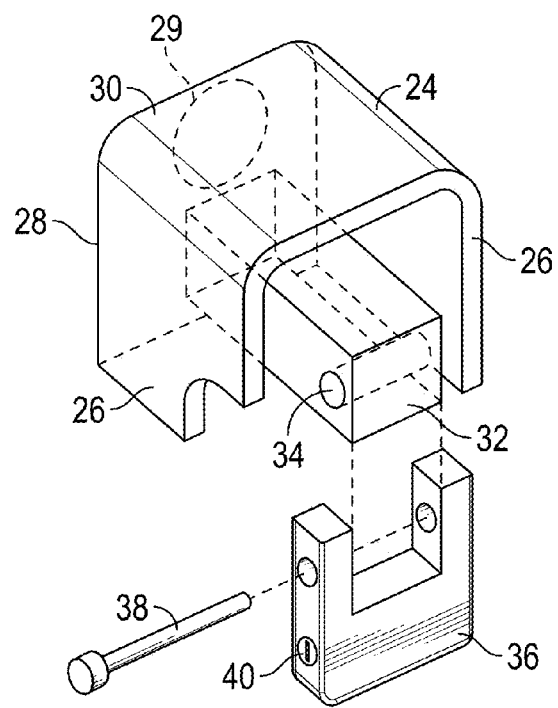
FIG. 5 is an exploded perspective view of the jack lock box and padlock assembly of the present invention.

The jack lock 10 includes a housing or box 24 in a preferred embodiment, the lock box 24 is four sided, and has opposite side walls 26, a front wall 28, and a top wall 30. The back and bottom of the lock box 24 is open for mounting the jack lock 10 onto the crank 18 and/or yoke 20. The front wall 28 includes a hole or opening 29 which allows the shaft 16 to extend through the box 24, depending on the length of the shaft 16. See FIGS. 1 and 5. The box 24 is preferably made of hardened steel, with the edges of the walls 26, 28 and 30 being welded together to form a rigid housing.

A pin or stub shaft 32 is welded to the front wall 28 and extends rearwardly. When the lock box 24 is positioned over the inner end of the crank 18, the pin 32 extends through the legs of the yoke 20, such that the end of the pin resides behind the yoke. The end of the pin 32 includes a hole 34. A padlock 36 has a shackle 38 which can be inserted through the hole 34 of the pin 32. A key cylinder 40 on the padlock 36 can be locked using a key (not shown), thereby securing the padlock 36 on the lock box 24.

To remove the jack lock 10 from the landing gear 14, the key is used to unlock the key cylinder 40 so that the shackle 38 can be removed from the pin 32. Then, the lock box 24 can be pulled forwardly away from the crank 18 and yoke 20 for removal. Then, after a tractor has been hooked to the trailer king pin, the crank 18 can be pivoted upwardly via the yoke 20 to an operative position so that the landing gear shaft 16 can be rotated to raise the legs 22 of the trailer 12.

The box 24 encloses the yoke 20 and hides the pin 32 when the jack lock 10 is mounted on the landing gear 14. The shackle of the padlock is protected by the walls of the box 24. Thus, it is very difficult, for a potential trailer thief to remove the jack lock, for example by cutting or grinding. Since time is the enemy of a thief, and since the jack lock 10 cannot be quickly or easily removed without the padlock key, the jack lock of the present invention deters theft of the trailer 12.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. In combination, a trailer having landing gear and a device for locking the landing gear, the landing gear having a horizontal rotatable shaft and a crank arm with a yoke at one end to pivotally connect the crank arm to the shaft such that the crank arm is pivotal between a raised operative position and a lowered inoperative position, the device comprising:
   a rigid box member having a front wall, opposite side walls and a top wall, with an open bottom and an open back;
   a horizontal stub fixed to the front wall and extending toward the open back, and having an end with a hole therethrough;
   a padlock adapted to be mounted in the hole on the end of the stub;
   wherein the box member is adapted to be mounted over the yoke when the crank arm is in the lowered inoperative position, with the stub extending through the yoke, so as to prevent the yoke from being moved to the raised operative position.

2. The combination of claim 1 wherein the box member surrounds the yoke on four sides.

3. The combination of claim 1 wherein the box member covers the front of the yoke.

4. The combination of claim 1 wherein the box member is mounted onto the yoke from a front side of the yoke.

5. The combination of claim 1 wherein the end of the stub resides behind the yoke.

6. The combination of claim 1 wherein the box member is mounted on the yoke without the use of tools.

7. The combination of claim 1 wherein the padlock has a shackle for mounting through the hole in the stub.

8. The combination of claim 7 wherein the shackle does not extend outwardly beyond the opposite side walls of the box member.

9. A lock box for a landing gear crank of a tractor-trailer, comprising:
   a four sided box to enclose the crank on four sides;
   a shaft extending rearwardly within the box and adapted to extend through a yoke on an inner end of the crank;
   wherein the box has four walls and two open sides, and the shaft extends from one of the walls toward one of the open sides; and
   a padlock mountable on the shaft to lock the box onto the crank.

10. The lock box of claim 9 wherein the box has an open rear portion to receive the yoke of the crank.

11. The lock box of claim 10 wherein the box has an open bottom portion to receive the crank.

12. The lock box of claim 9 wherein the box is mountable on the crank without tools.

13. The lock box of claim 9 wherein the padlock has a shackle removably insertable through a hole in the shaft.

14. The lock box of claim 13 wherein the shackle is not exposed outside the box.

15. A jack lock for a trailer landing gear assembly having a crank handle pivotally connected to a jack shaft via a yoke, the jack lock comprising:
    a housing partially surrounding the yoke;
    a pin extending rearwardly within the housing and through the yoke to preclude movement of the crank handle to an operative position;
    a lock extending through the pin to prevent removal of the pin from the yoke;
    wherein the housing has an open back to permit mounting of the housing over the yoke; and
    wherein the pin extends towards the open back.

16. The jack lock of claim 15 wherein the housing has two open contiguous sides to allow mounting of the housing around the yoke.

17. The jack lock of claim 15 wherein the lock includes a lock cylinder which is operative using a key.

18. The jack lock of claim 15 wherein the lock includes a shackle removably mounted through a hole in the pin.

19. The jack lock of claim 18 wherein the shackle does not reside outside the housing.

* * * * *